United States Patent [19]

Wade

[11] 3,846,526

[45] Nov. 5, 1974

[54] METHOD OF FORMING A PLASTIC CONTAINER

[75] Inventor: Gordon E. Wade, Glen Riddle, Pa.

[73] Assignee: Scott Paper Company, Delaware County, Pa.

[22] Filed: July 31, 1972

[21] Appl. No.: 276,826

Related U.S. Application Data

[62] Division of Ser. No. 10,742, Feb. 12, 1970, Pat. No. 3,703,255.

[52] U.S. Cl. ............... 264/46.8 A, 264/48, 264/90, 264/DIG. 78, 264/45.5 A
[51] Int. Cl. ............................................. B29d 27/00
[58] Field of Search ............ 264/45.48, 90, DIG. 78

[56] References Cited
UNITED STATES PATENTS

| | | | |
|---|---|---|---|
| 2,951,260 | 9/1960 | Harrison et al. | 264/53 X |
| 3,159,693 | 12/1964 | Plymale | 264/53 |
| 3,178,491 | 4/1965 | Dart | 264/53 |
| 3,260,781 | 7/1966 | Lux et al. | 264/48 X |
| 3,338,997 | 8/1967 | Tigner | 264/89 |
| 3,444,282 | 5/1969 | Burkett | 264/48 |
| 3,484,510 | 12/1969 | Corazza | 264/51 |
| 3,505,436 | 4/1970 | Krug et al. | 264/45 |
| 3,627,162 | 12/1971 | Dossin | 264/45 X |
| 3,666,162 | 5/1972 | Tiffin et al. | 264/48 X |

*Primary Examiner*—H. S. Cockeram
*Attorney, Agent, or Firm*—Martin L. Faigus; William J. Foley

[57] ABSTRACT

A foamed, cellular thermoplastic container has a sidewall, at least a substantial portion of which is thicker and less dense than a bottom wall and lip region between which said sidewall is disposed. In a first embodiment of the invention the inner and outer surfaces defining the sidewall are uninterrupted, smooth surfaces, and in a second embodiment of the invention the inner surface of the sidewall is smooth and the outer surface is provided with alternate ridges and valleys. A process for thermoforming foamed, cellular thermoplastic containers from sheet material in which the sheet is positioned between mold members which are brought into a final forming position to define a cavity, portions of which conform to the configuration of the container to be formed, and a reduced pressure is applied to opposite sides of the sheet within the sidewall region of the mold to permit entrapped gases in the cellular structure of the sheet to expand to thereby increase the thickness and lower the density of the sidewall of the container.

5 Claims, 11 Drawing Figures

METHOD OF FORMING A PLASTIC CONTAINER

RELATED APPLICATIONS

This application is a division of U.S. Pat. application Ser. No. 10,742, filed Feb. 12, 1970, and now U.S. Pat. No. 3,703,255, entitled METHOD OF FORMING A PLASTIC CUP AND THE ARTICLE PRODUCED THEREBY.

BACKGROUND OF THE INVENTION

1. Field of the Invention

This invention relates to foamed, cellular thermoplastic containers, and more specifically to a foamed cellular thermoplastic cup having a lip region defining an opening into the cup, a bottom wall, and a sidewall which is intermediate, thicker than and less dense than said lip region and bottom wall. The invention also relates to a process for forming the above cup.

2. Description of the Prior Art

It is known in the prior art to provide thickened regions in the sidewall of a plastic container as exemplified in U.S. Pat. No. 3,121,767, issued to Welshon and U.S. Pat. No. 3,141,595, issued to Edwards.

The Welshon U.S. Pat. No. (3,121,767) discloses a method of forming selected thick portions in a cup made from a solid, as opposed to a foamed, cellular, thermoplastic material. A greater weight of solid thermoplastic material than foamed thermoplastic material is required to manufacture identically dimensioned cups because solid thermoplastic material has a higher density. Since raw plastic material is uniformly sold on a per pound basis, the greater the weight of material used to manufacture a cup, the greater the cost.

The thickened regions of the cup disclosed in the Welshon patent are provided by varying the relative speed of movement between male and female mold members, and also by chilling selected regions of the sidewall whereby the degree of stretching of the plastic is controlled in preselected regions of the cup. The regions of increased thickness result from differential stretching in the sidewall. Thin spots which might occur because of excessive stretching of the cup cannot be corrected; therefore, such cups would be rejected. The reliability and repeatability of the process disclosed in Welshon requires accurate control of base sheet properties, amount of cooling in selected regions of the base sheet, and mold cycling rates.

The Edwards U.S. Pat. No. (3,141,595) discloses a plastic cup made from a laminate of foamed material, such as low density polystyrene having a density of approximately 6–10 lbs. per cubic foot, and a high density material such as a high impact polystyrene sheet having a density of approximately 63 lbs. per cubic foot. The cup is provided with a series of projections which represent thickened sidewall regions having a lower density than portions of the sidewall remote from the projections. Edwards achieves the thickening and lowering of the density in the sidewall regions as a result of the migration of entrapped gases through ruptured cells in the foamed material at the interface between the foamed, low density material and the unfoamed high density material. The Edwards disclosure does not relate to providing a continuous uninterrupted outer surface on a sidewall which is thickened, nor to providing thickened sidewall regions in a single ply cup.

It is also known in the prior art to provide a vacuum on opposite sides of a foamed styrene sheet to permit entrapped gases in the sheet to expand whereby said sheet will expand into conformity with the surfaces of a mold defining the cavity, as exemplified in U.S. Pat. No. 3,484,510, issued to Corazza, and assigned to the assignees of the present application. The Corazza patent is not specifically directed to a foamed, cellular, thermoplastic container in which a sidewall portion thereof is exposed to a vacuum on opposite sides thereof whereby regions thinned by stretching which do not completely fill the cavity will be expanded to increase the thickness and lower the density, and wherein said container further has a compressed lip region which is hard and rigid to add stability to the cup, and a base region which is thinner and less dense than the sidewall.

SUMMARY OF THE INVENTION

This invention relates to a plastic cup manufactured from foamed, cellular, thermoplastic sheet material having non-porous, densified skins provided on opposite surfaces thereof. The cup has a bottom wall, a sidewall extending upwardly from the bottom wall and terminating in an upwardly and outwardly extending nesting ledge. A collar extends upwardly from the nesting ledge and terminates in a lip region comprising an upper curved section and an outwardly and downwardly extending skirt portion terminating in a free end. The skirt portion is subsequently rolled in conventional equipment, such as a screw-type lip roller disclosed in U.S. Pat. No. 3,096,546.

The sidewall of the cup is thicker and less dense than the bottom wall and lip region of the cup. The thick, low density sidewall region provides excellent insulation properties whereby hot aqueous solutions such as boiling water can be placed in the container and held indefinitely without causing any discomfort to the holder of the cup. The higher density, thinner bottom wall and lip region do not have the insulating properties of the sidewall, but such properties are not necessary in these regions.

The densified lip region is harder than, more rigid than, and resists compressive loading better than, the sidewall region of the container, whereby the densified lip region adds stability to said container and prevents jamming of nested cups. In addition, providing a thin, dense, rigid lip region permits accurate control over the lip rolling operation. It is difficult, if not impossible to accurately lip roll a thick plastic lip.

The outer periphery of the bottom wall is rounded to provide a resilient mount for the cup, whereby excessive loads applied to the cup when a lid is forced onto the open end thereof will not permanently distort the cup. Prior art cups which have not been provided with rounded peripheral base portions have been found to collapse in the sidewall region, i.e., mushroom out or deflect inwardly, as a result of excessive axial forces being applied to the cup when a lid is placed on the open mouth thereof. Such pressures are normally encountered in the fast food service industry where due to the large volume of business transacted lids are hurriedly put on with excessive forces.

The cup of this invention is formed by positioning a foamed, cellular thermoplastic sheet between male and female mold members of a thermoformer, and bringing the mold members into telescoping relationship wherein portions of the sheet filling the cavity in the lip region, and in most instances the bottom wall region, are compressed between said members, and the strip positioned in portions of the sidewall region of the cavity is merely stretched by the thermoforming operation. After the mold members have come to rest in their final forming position a vacuum is applied from opposite sides of the sheet to expand portions of the sheet which have been stretched in the sidewall cavity region to thereby increase the thickness and reduce the density of the sidewall. If it is desired to produce a cup with a smooth uninterrupted inner surface, and an exterior surface provided with alternate ridges and valleys, the female mold can be modified to include alternate ridges and valleys in the regions where the sidewall of the container will be formed.

It is an object of this invention to provide a single ply, foamed plastic container having a sidewall which is thicker and less dense than the lip region and bottom wall thereof.

It is a further object of this invention to provide a single ply, foamed plastic container in which the plastic is foamed, cellular polystyrene having non-porous, highly densified outer and inner skin surfaces.

It is a further object of this invention to provide a single ply, foamed polystyrene container having a well-defined nesting ledge between the lip region and sidewall of the cup.

It is a further object of this invention to provide a single ply, foamed plastic container in which the bottom wall is defined in part by a stretched, rounded corner.

It is a further object of this invention to provide a single ply, foamed plastic container in which the outer sidewall surface is provided with alternate ridges and valleys therein, and the inner sidewall surface is substantially smooth and uninterrupted.

It is a further object of this invention to provide a method for forming plastic containers with a sidewall region which is thicker and less dense than the bottom wall and lip region.

It is a further object of this invention to provide a method for manufacturing plastic cups in which the lip region is compressed, and stretched sidewall portions are expanded in the sidewall region of the cavity.

It is a further object of this invention to provide a method for manufacturing a plastic cup having an infinite holding time from a foamed, cellular thermoplastic sheet having a density in the range of approximately 33–37 pounds per cubic foot.

Other objects and advantages of the present invention will become apparent from the following detailed description of the invention taken in conjunction with the drawing.

DESCRIPTION OF THE PREFERRED EMBODIMENTS OF THE INVENTION

Figure 2:
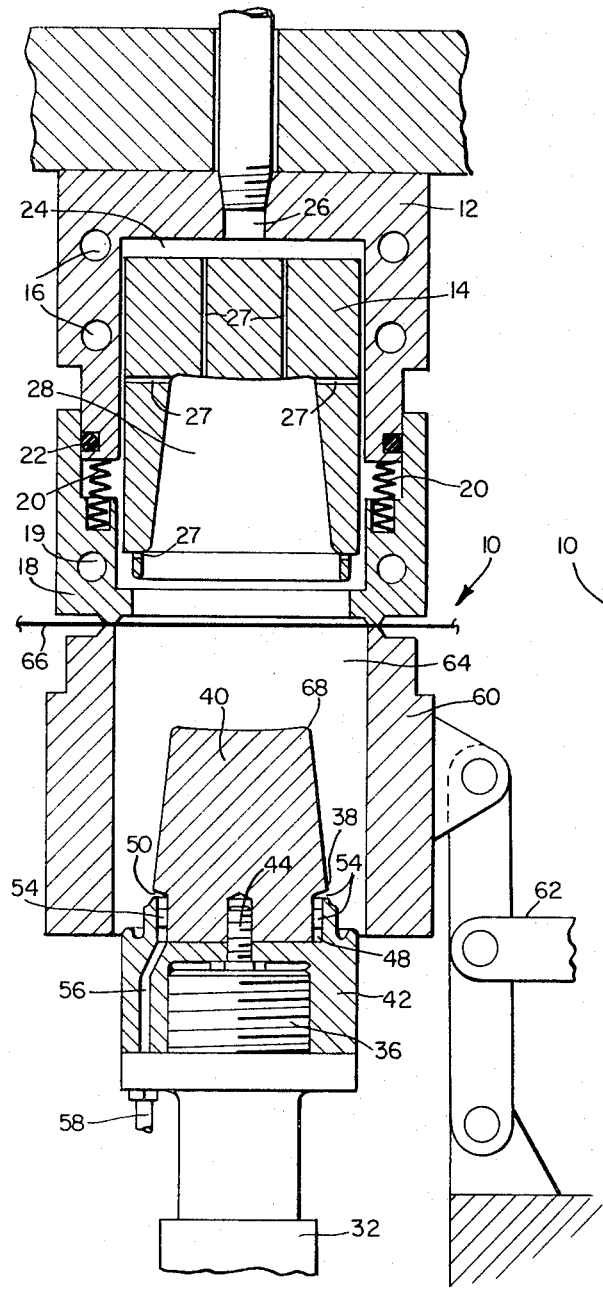
Figure 3:
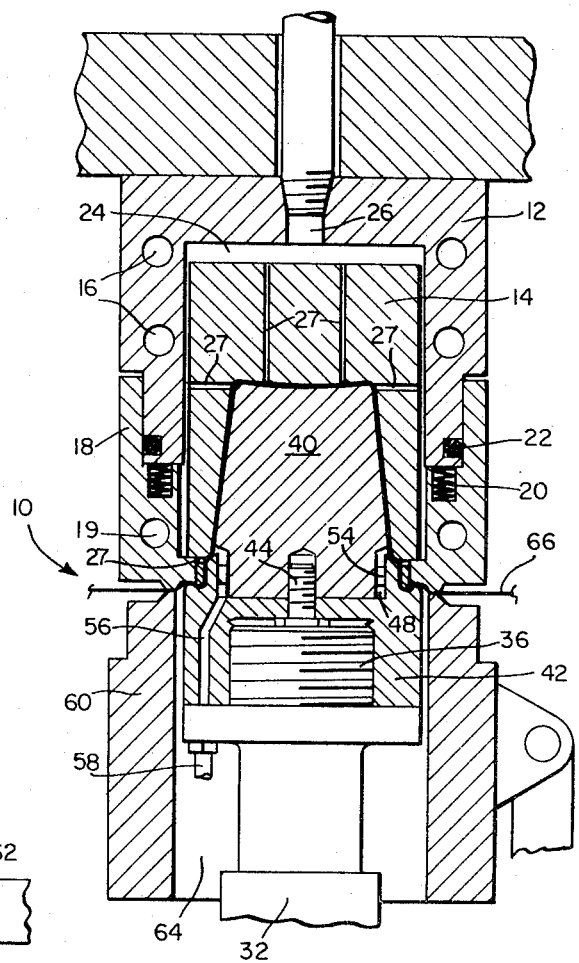

The construction of a mold assembly 10 for forming the cups of this invention will be explained with reference to FIGS. 1–3. The mold assembly comprises a male and female mold member which defines a cavity therebetween having the approximate configuration of an article to be formed when the mold members are in telescoping relationship with respect to each other and in their final forming position. The female portion of the mold assembly 10 is comprised of an upper mold block 12 which supports a female mold member 14 by suitable fastening means (not shown). The upper mold block is provided with suitable cooling passages 16. A stripper plate 18 having cooling passages 19 therein is mounted to the upper mold block 12 for axial movement relative to said mold block by a plurality of compression springs 20. An O-ring 22 is mounted about the periphery of the upper mold block 12 to provide an effective seal between said mold block and the stripper plate.

A manifold section 24 is provided between the upper mold block and the female mold member and is in communication with a vacuum port 26 extending through upper mold block 12. A suitable vacuum pump (not shown) is connected through vacuum port 26 to establish the desired vacuum. The manifold section 24 is in communication with vacuum passages 27 which are in turn in communication with the cavity 28 of female mold member 14.

Figure 1:
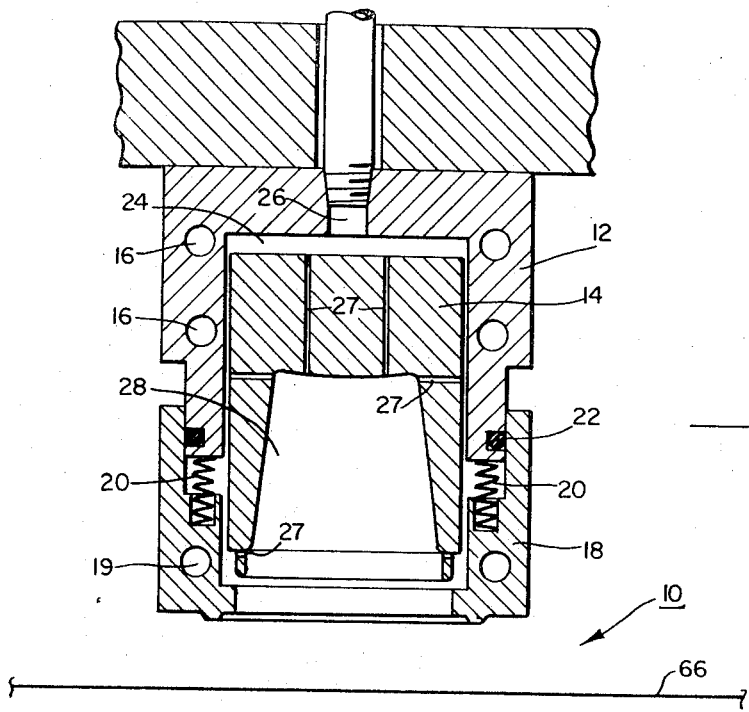
FIGS. 1–3 are sectional views of the mold members utilized to form the cup of this invention showing sequential steps in the formation of said cup.
Figure 1:
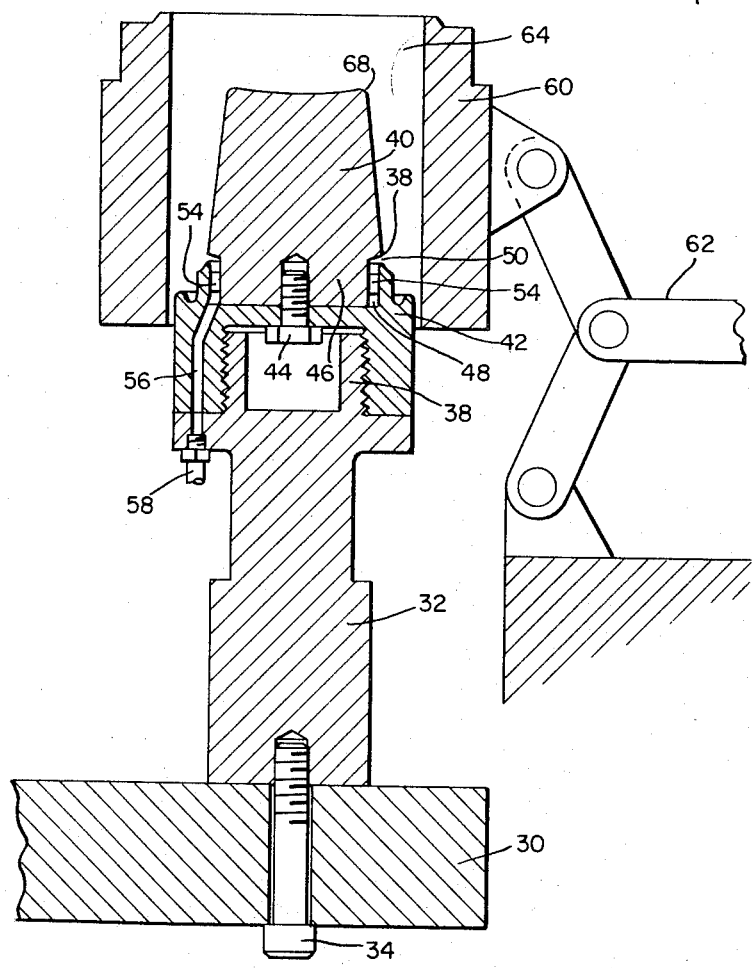

The mold assembly 10 further includes a lower mold block 30 to which a mold support 32 is connected by suitable fastening means, such as screws 34 (one of which is shown in FIG. 1). The mold support 32 has an upwardly extending, externally threaded hub 36 to which a male mold member 38 is connected. The male mold member 38 is comprised of an upper male mold section 40 and a lower male mold section 42, and the lower male mold section is provided with an internally threaded chamber which is readily connected to externally threaded hub 36. The upper and lower male mold sections, 40, 42 are connected by a threaded bolt 44, or like fastening device.

A reduced neck portion 46 defining the lower end of upper male mold section 42 defines an annular manifold chamber 48 extending about the entire peripheral edge of the upper male mold section 40. The annular manifold chamber 48 is in communication with vacuum passages 50 through a plurality of slots which are defined between circumferentially spaced radially extending projections 54. A vacuum port 56 extends through the lower male mold section 42 and is in communication with the annular manifold chamber 48. A connecting tube 58 is in communication with the vacuum port 56 and a pressure reducing source, such as a vacuum pump (not shown).

A clamp plate 60 is mounted for axial movement relative to the male mold member 38, and is actuated by a toggle-link assembly 62. The clamp plate is provided with an annular opening 64 through which the male mold member 38 can reciprocate.

Although a single mold assembly has been described in detail, it is contemplated that a plurality of male mold members will be mounted on a common support and a plurality of female mold assemblies will also be mounted on a common support whereby a plurality of cups will be formed during a single forming operation. Multiple mold assemblies are clearly shown in Edwards U.S. Pat. No. 3,172,159 and in U.S. Pat. No. 3,570,064, issued Mar. 16, 1971, and assigned to the assignees of this patent application.

The cups of this invention are formed from a foamed, cellular polystyrene sheet having a cellular core region and non-porous skins on opposite surfaces thereof which have a greater density than said cellular core. Obviously other types of cellular, foamed materials could be employed with equal success, such as polyethylene foams, provided that the foams have good theremoforming characteristics and will retain their shape upon cooling.

Although not forming a part of the present invention, a brief explanation of the method of forming the sheet 66 will be helpful. The sheet is preferably formed according to the method disclosed in co-pending application Ser. No. 752,295, assigned to the assignees of this application, and a brief explanation will be included herein, although reference should be made to the above-referred to co-pending application for further details. A mixture of 57 percent scrap polystyrene and 43 percent virgin polystyrene is extruded through a T-die into sheet material. The 43 percent virgin polystyrene consists of 60 percent of a medium impact polystyrene, and 40 percent of a general purpose polystyrene, both of which can be purchased from Foster Grant. In addition blowing agents such as sodium bicarbonate, mono-sodium citrate and calcium stearate are included in the mixture. Although the process is preferably run with a mixture of both scrap and virgin polystyrene, the process can be run with either 100 percent scrap or 100 percent virgin material. After the sheet 66 is extruded from the T-die the lower surface thereof immediately contacts an extended die lip which is at least 150°F. below the extrudate temperature, whereby a non-porous densified skin layer is provided on the lower surface. An air knife blows air at a temperature of approximately 100° lower than the extrudate temperature onto the upper surface of the extrudate sheet, whereby a densified skin layer is provided thereon. The densified layer on the upper surface is not completely non-porous, i.e., broken cells exist on the surface; however, the skin on the upper surface is sufficiently dense and smooth to permit excellent printing thereon. Because the upper surface is not completely non-porous, the containers of this invention are preferably formed with said surface as the outer surface. The extruded sheet 66 has a cellular core with entrapped gases therein. The sheet 66 can either be fed directly to the thermoforming apparatus from the extruding apparatus, or it can be rolled and stored as inventory for use as needed. The sheet material has a density of approximately 33 to 37 lbs. per cubic foot and a thickness in the range of approximately 0.078 inches to 0.090 inches.

When the polystyrene sheet material 66 is stored in rolls, the sheet is transferred from the roll by an intermittently operating drive mechanism, such as a chain drive means, through an oven where the sheet is heated to its forming or stretching temperature, and then to the mold assembly 10 wherein the cups are formed. In the preferred embodiment of this invention, the cups are not separated from the strip during the thermoforming operation, and a separate punch press is utilized for this purpose; however, if desired the cups could be completely punched from the sheet during the forming step. The web is advanced through the forming section of the machine in an intermittent manner, moving one index length (the length of the forming tooling in the machine direction) during each advance.

The method of manufacturing the cups of this invention will now be described with reference to FIGS. 1–3. The forming temperature for the foamed, cellular polystyrene is approximately 270°F. and therefore the sheet is heated to a slightly higher temperature in an oven just preceding the thermoforming station, since some heat loss will occur in the sheet as it moves from the oven into thermoforming position between female mold member 14 and male mold member 38 of the mold assembly 10. With the sheet 66 positioned between the mold members 14 and 38, the toggle link assembly 62 is actuated to bring the clamp plate 60 into engagement with the lower surface of the sheet and properly position said sheet with respect to the mold members. Thereafter, a suitable hydraulic arrangement (not shown) moves the upper mold block in a downward direction, and the stripper plate 18 which is mounted to the mold block 12 through compression springs 20 also moves axially downward to the position indicated in FIG. 2. Thereafter, further downward movement of the upper mold block 12 causes relative movement between the stripper plate 18 and the mold block 12 and a corresponding compression of the springs 20 to provide the desired clamping force along a peripheral region enclosing the portion of the strip 66 which is to be thermoformed (FIG. 3).

Figure 4:
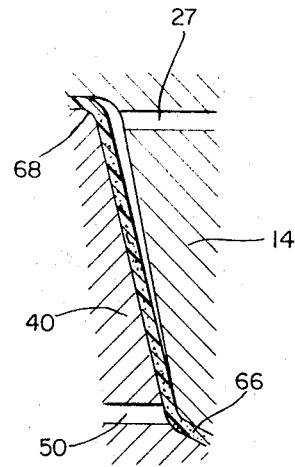
FIG. 4 is a half sectional view of the mold members and cup after the mold members have been brought into final forming position but before any vacuum has been applied.
Figure 5:
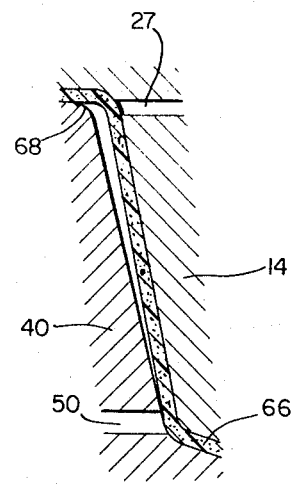
FIG. 5 is a view similar to FIG. 4, but showing the mold members and cup after a vacuum has been applied only through the female mold member.
Figure 6:
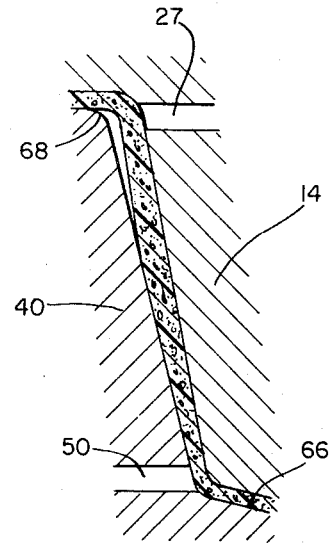
FIG. 6 is a view similar to FIGS. 4 and 5, but showing the mold members and cup after a vacuum has been applied through both the male and female mold members.

Referring in detail to FIGS. 3–6, the next step in the method involves the movement of lower mold block 30 upwardly by the action of suitable hydraulic or pneumatic means (not shown) to a position wherein the male mold member 38 is telescoped within the cavity 28 of the female mold member 14 in its final forming position. In this final forming position, the peripheral surfaces of the male mold and female mold define a cavity which conforms generally to the shape of the container which is to be formed. The sheet material is compressed between the mold members in the lip defining, and the base defining cavity regions between said mold members. The male mold section 40 has an upper peripheral edge 68 which tends to impede stretching of the sheet 66 in the bottom wall region of the cavity due to the resistance of this edge to sliding of the sheet. Therefore, during the thermoforming operation the sheet is primarily stretched in the sidewall region of the cavity with a lesser amount of stretch occurring in the bottom wall region of the cavity. When the mold members 14, 38 are in their final forming position, the sidewall is stretched such that it does not fill the entire cavity defining the sidewall of the cup (FIG. 4). To expand the sidewall region of the cup to thereby eliminate thin spots and reduce the density, a vacuum is first pulled through vacuum port 26 which communicates with vacuum passages 27 in the female mold member 14. By applying this vacuum first the sheet is pulled away from the male mold member and into conformity with the walls defining cavity 28 to accurately shape the outer surface of the cup (FIG. 5). Approximately 1/10 of a second after the vacuum is initiated through vacuum port 26, a vacuum is pulled through vacuum port 48 which communicates with vacuum passage 58 in the male mold member 40. This vacuum causes a reduced pressure region on the face of the sheet which constitutes the inner surface of the cup in the region of the cavity defining the sidewall of the cup, whereby entrapped gases in the sheet expand the sheet to thereby increase the thickness, whereby thin spots are removed and density is decreased (FIG. 6). While the mold members 14 and 38 are in their final forming position, and during the period in which the vacuum is being applied, cooling fluid which is passing through the cooling passages 16 in the mold block 12, cooling passage 19 in stripper plate 18, and cooling passages in the interior of male mold member 40 (not shown) cool and thereby solidify the formed container.

Figure 7:
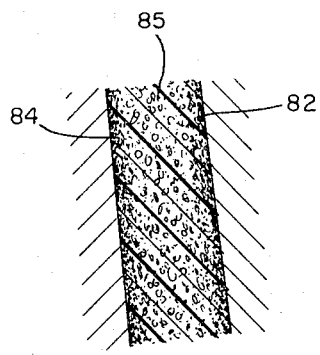
FIG. 7 is an exploded view of an expanded portion of the sidewall of the cup shown in FIG. 6.
Figure 8:
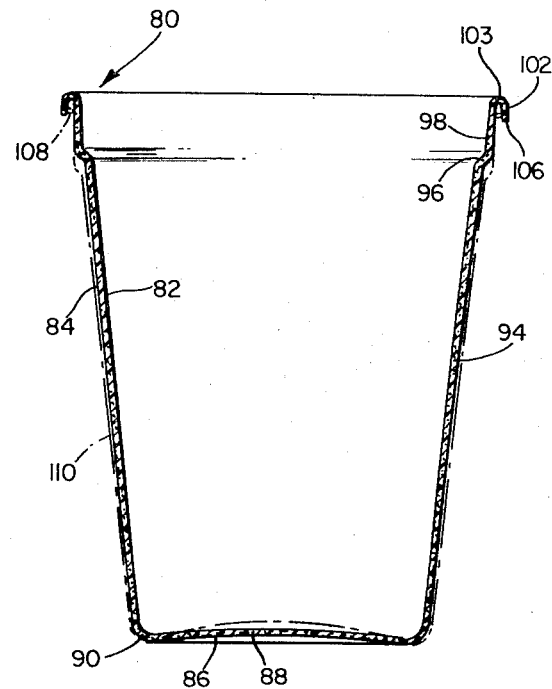
FIG. 8 is a sectional view through a preferred embodiment of the cup of this invention showing the rolled lip in dotted representation and also the configuration the cup assumes when an axial load is applied to the lip region thereof.
Figure 9:
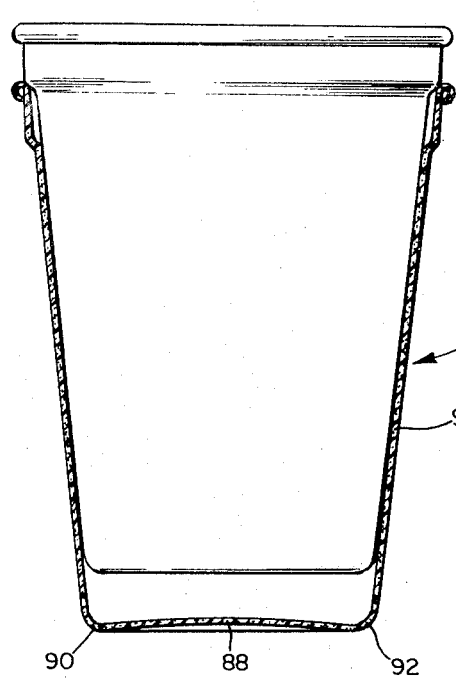
FIG. 9 is a sectional view showing the cup of FIG. 8 in nesting relationship with a like cup.

Specific details of construction of one embodiment of the container formed according to the method of this invention will be described with respect to FIGS. 8 and 9. The container which is specifically disclosed in this application is a deep drawn cup commonly utilized to contain hot fluids and to prevent irritation to the holder thereof. By deep drawn is meant a drawn cup wherein the ratio of the depth to the widest portion is at least 1:1. Such cups can be made in standard sizes, such as 6 ounces and 8 ounces. The foamed, cellular thermoplastic cup 80 illustrated in FIGS. 8 and 9 is provided with a high gloss non-porous densified skin layer on the inner surface 82, an outer densified, high gloss surface 84, and a low density cellular core 85 (FIG. 7). The cup has a bottom wall 86 comprised of a concave central portion 88 and a rounded outer corner 90 defining an annular ledge 92 at their junction. A sidewall 94 projects upwardly and outwardly from the outer rounded corner 90 of the bottom wall 86 and terminates in a sharply defined nesting ledge 96. A collar region 98 extends upwardly from the nesting ledge and terminates in a lip region comprising an outwardly and downwardly extending skirt portion 102 extending from an upper curved surface 103 thereof. The skirt portion 102 of the cup terminates in a free edge 106 which is rolled inwardly as indicated by the dotted representation 108 (FIG. 8) by suitable lip rolling equipment, such as the helical screw lip rollers presently in common usage.

The sidewall 94 is the thickest and least dense region of the cup. The rounded outer corner 90 is a thin, stretched region which is flexible and which will pivot about the annular ledge 92 (FIG. 9), which is the portion of the cup contacting a surface upon which the cup may be placed, upon the application of excessive forces to the lip region. It is quite common that excessive forces will be applied to cups utilized in the fast food service area, wherein waitresses and other attendants do not have the time to gently ease a lid onto a container. The problem of mushrooming at the sidewalls 94 of the cup 80 is greatly reduced by the provision of the outer rounded corner 90 and annular ledge 92 which rests upon the table. When an axial force is applied to the open mouth of the cup the force is transmitted to the resilient outer round corner 90 which resiliently flexes about the annular ledge 92 to assume the position shown in dotted representation at 110 in FIG. 8. Upon removal of the axial load, the resilient nature of the outer rounded corner permits the cup to return to its normal, or inflexed condition.

The nesting ledge 96 represents a transition portion from the sidewall 94 to the collar 98, i.e., the thickness of the nesting ledge decreases and the density increases in a direction from the sidewall to the lip region. It is understood that the nesting ledge alternatively can be a segment of uniform thickness and density. The nesting ledge 96 joins the collar 98 at a sharply defined edge resulting from providing a vacuum passage 27 at the edge defining region of the female mold. The cup of this invention has significantly improved insulation properties from other hot drink foamed cellular cups manufactured from sheet material having a density in the range of from approximately 33–37 pounds per cubic foot. It is not feasible to assign a specific density or thickness to the sidewall of the cup since the density varies from top to bottom, and around the circumference of the cup. It is sufficient to state that the cup of this invention containing boiling water can be held indefinitely by a person. Prior to applicant's invention it was difficult to reliably and repeatedly make an acceptable hot drink cup from a foamed cellular plastic sheet having a density as high as 33–37 pounds per cubic foot. Since the art of thermoforming is less developed for thermoforming low density sheets, i.e., around 10 pounds per cubic foot, than it is for thermoforming sheets having a density in applicant's range, the advantages of applicant's process are self-evident. Another advantage of applicant's process is that the application of a two-sided vacuum compensates for thin spots which may result from uneven stretching caused by variations in base sheet properties.

The low density in the sidewall 94 of the cup in conjunction with the densified hard lip region defines a novel structure heretofore not taught by any of the prior art applicant is aware of. The densified rigid lip region, in addition to adding stability to the cup, prevents jamming between nested cups which might otherwise occur if the lip region were softer. In stacked condition, the outer edge of the nesting ledge of one cup rests approximately upon the inner region of the arcuate portion 103 of a like cup as shown in FIG. 9.

Figure 10:
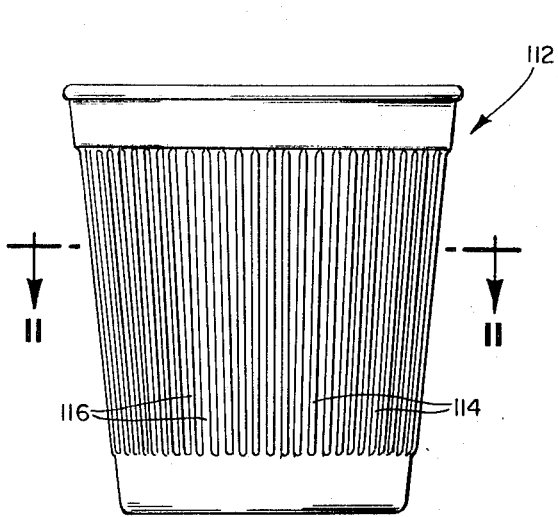
FIG. 10 is a front elevation view of a second preferred embodiment of the cup of this invention.
Figure 11:
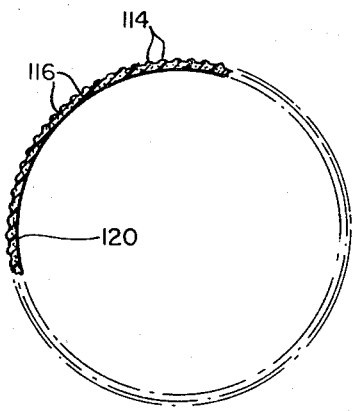
FIG. 11 is a transverse cross-sectional view taken through a line 11—11 of FIG. 10.

A second embodiment of this invention is shown at 112 in FIGS. 10 and 11. In this embodiment the cup 112 is provided with an expanded sidewall region similar to that described with respect to the first embodiment of this invention, with the exception that the peripheral surface of the female mold member is provided with alternate ridges and valleys to form alternate ridges 114 and valleys 116 in the outer surface of the sidewall of the cup. The interior surface 120 of the cup is formed as a continuous, smooth uninterrupted surface. Therefore, the ridge regions of the cup are thicker and less dense than the valley regions of the cup and thereby provide insulation for a holder engaging the sidewall of the cup. This construction has the advantage of providing the necessary degree of insulation to protect a holder of the cup, while permitting the use of less material in the cup than is required to manufacture the cup 80 shown in FIGS. 8 and 9. Less material is necessitated because the valley regions in the sidewall of the cup can be much thinner than the sidewall 94 of the cup 80, without detracting from the insulating qualities in the sidewall regions of the cup. In other respects the cup 112 is substantially the same as the cup 80.

What is claimed is:

1. A method of forming a foamed thermoplastic container having a bottom wall, a sidewall joining said bottom wall and extending upwardly and outwardly from said bottom wall, said sidewall having an inner surface which is free of protuberances, a lip defining an opening into said container, and a nesting ledge extending outwardly from said sidewall and disposed imtermediate the upper end of said sidewall and said lip, said method comprising the steps of:

A. clamping a heated, foamed, cellular thermoplastic sheet between male and female mold members, said male and female mold members when brought into telescoping relationship with each other defining the boundaries of a cavity therebetween, said cavity including a bottom region in which the bottom wall of the container is formed, a side region in which the entire sidewall of the container is formed, a nesting ledge region in which the nesting ledge is formed and lip region in which said lip is formed, the side surface of the male mold member which defines one boundary of the side region of the cavity is joined to a bottom surface of the male mold member which defines one boundary of the bottom region of the cavity, said side surface continuously sloping outwardly from the bottom surface and being substantially smooth and uninterrupted;

B. relatively moving said male and female mold members into final forming position to stretch said sheet into said cavity so that said sheet is compressed in the bottom region and the lip region of the cavity and incompletely fills the side region of said cavity; and C. applying a vacuum to opposite sides of the sheet in the side region of the cavity to expand the sheet into conformity with substantially the entire cooperating surfaces of the mold members which define said side region to thereby form a container in which the sidewall has a greater thickness and a lower density than the lip region and the compressed bottom region.

2. The method according to claim 1 wherein said container is made from a foamed, cellular thermoplastic sheet having entrapped gases therein, said sheet having opposed surfaces of highly densified skin layers, at least one of said layers being non-porous.

3. The method according to claim 2 comprising the additional step of cooling said container while the molds are in their final forming position to thereby solidify the thermoplastic material to stabilize said container.

4. The method according to claim 3, wherein said container is a deep drawn cup.

5. The method according to claim 1, wherein the thermoplastic sheet has a density in the range of approximately 33–37 pounds per cubic foot.

* * * * *